US012256176B2

(12) United States Patent
Takahashi et al.

(10) Patent No.: US 12,256,176 B2
(45) Date of Patent: *Mar. 18, 2025

(54) IMAGE PROCESSING SYSTEM, IMAGE PROCESSING METHOD, AND PROGRAM

(71) Applicant: NEC Corporation, Tokyo (JP)

(72) Inventors: Yusuke Takahashi, Tokyo (JP); Hiroo Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,169

(22) Filed: Jun. 28, 2021

(65) Prior Publication Data
US 2021/0329175 A1 Oct. 21, 2021

Related U.S. Application Data

(63) Continuation of application No. 16/837,061, filed on Apr. 1, 2020, now Pat. No. 11,082,634, which is a (Continued)

(30) Foreign Application Priority Data

Jul. 31, 2012 (JP) ................................ 2012-170403

(51) Int. Cl.
*G06K 9/00* (2022.01)
*G06V 10/70* (2022.01)
(Continued)

(52) U.S. Cl.
CPC ............. *H04N 7/18* (2013.01); *G06V 10/768* (2022.01); *G06V 20/30* (2022.01); *G06V 20/52* (2022.01);
(Continued)

(58) Field of Classification Search
CPC .. G06K 9/72; G06K 9/00771; G06K 9/00369; G06K 9/00677; H04N 5/23229; H04N 5/23293; H04N 7/18; H04N 5/247
See application file for complete search history.

(56) References Cited

U.S. PATENT DOCUMENTS 5,487,172 A * 1/1996 Hyatt ...................... G06F 13/16
700/8
5,784,047 A * 7/1998 Cahill, III ................ G09G 5/14
345/555
(Continued)

FOREIGN PATENT DOCUMENTS

JP 2004-062560 A 2/2004
JP 2006-081053 A 3/2006
(Continued)

OTHER PUBLICATIONS

International Search Report for PCT Application No. PCT/JP2013/066568, mailed on Aug. 6, 2013.
(Continued)

*Primary Examiner* — Philip P. Dang
(74) *Attorney, Agent, or Firm* — Sughrue Mion, PLLC

(57) ABSTRACT

An image processing system, an image processing method, and a program capable of implementing an association of a person appearing in a video image through a simple operation are provided. The image processing system includes an input device which accepts input of video images captured by a plurality of video cameras, a display screen generating unit which causes a display device to display at least one video image among the video images inputted from the input device, and a tracked person registering unit which is capable of registering one or more persons appearing in the video image displayed by the display device. When a person appears in the video image displayed by the display device, the display screen generating unit selectably displays person (Continued)

images of one or more persons, which are associable with the person appearing in the video image and which are registered by the tracked person registering unit, in a vicinity of the video image.

24 Claims, 6 Drawing Sheets

Related U.S. Application Data continuation of application No. 16/274,474, filed on Feb. 13, 2019, now Pat. No. 10,623,659, which is a continuation of application No. 14/417,880, filed as application No. PCT/JP2013/066568 on Jun. 17, 2013, now Pat. No. 10,368,010.

(51) Int. Cl.
- G06V 20/30 (2022.01)
- G06V 20/52 (2022.01)
- G06V 40/10 (2022.01)
- H04N 7/18 (2006.01)
- H04N 23/63 (2023.01)
- H04N 23/80 (2023.01)
- H04N 23/90 (2023.01)

(52) U.S. Cl.
CPC ........... G06V 40/103 (2022.01); H04N 23/63 (2023.01); H04N 23/631 (2023.01); H04N 23/80 (2023.01); H04N 23/90 (2023.01)

(56) References Cited

U.S. PATENT DOCUMENTS

| | | | |
|---|---|---|---|
| 5,936,610 A * | 8/1999 | Endo | G06F 3/005 345/157 |
| 6,476,821 B2 * | 11/2002 | Sawada | G09G 1/165 715/764 |
| 6,665,004 B1 * | 12/2003 | Paff | G08B 13/19689 348/156 |
| 7,089,216 B2 * | 8/2006 | Van Overveld | G06Q 30/02 706/14 |
| 7,106,374 B1 * | 9/2006 | Bandera | H04N 23/951 348/308 |
| 7,224,381 B2 * | 5/2007 | Inoue | H04N 7/147 348/14.02 |
| 7,382,395 B1 * | 6/2008 | Saburi | H04M 1/0214 348/14.02 |
| 7,423,746 B2 | 9/2008 | Takeda et al. | |
| 7,528,879 B2 * | 5/2009 | Kuroki | H04N 7/144 348/333.03 |
| 7,542,210 B2 * | 6/2009 | Chirieleison, Sr. | G02B 27/0172 359/630 |
| 7,583,271 B2 | 9/2009 | Kawakami et al. | |
| 7,623,733 B2 * | 11/2009 | Hirosawa | H04N 5/272 348/222.1 |
| 7,702,015 B2 * | 4/2010 | Richter | H04N 21/4382 348/121 |
| 7,738,032 B2 * | 6/2010 | Kollias | G03B 29/00 348/370 |
| 7,826,730 B2 | 11/2010 | Wakamatsu et al. | |
| 7,835,550 B2 * | 11/2010 | Tamaru | G06F 16/51 715/838 |
| 7,852,356 B2 * | 12/2010 | Takikawa | H04N 23/61 345/660 |
| 7,881,505 B2 * | 2/2011 | Schneiderman | G11B 27/34 382/118 |
| 7,890,136 B1 * | 2/2011 | Fujisaki | H04M 1/0266 455/12.1 |
| 8,026,942 B2 * | 9/2011 | Payonk | H04N 23/663 600/306 |
| 8,031,914 B2 * | 10/2011 | Zhang | G06F 16/5854 382/160 |
| 8,150,109 B2 | 4/2012 | Sung et al. | |
| 8,175,409 B1 * | 5/2012 | Wilensky | G06T 7/12 382/274 |
| 2001/0055414 A1 * | 12/2001 | Thieme | G06T 11/60 382/162 |
| 2007/0244902 A1 * | 10/2007 | Seide | G06F 16/78 |
| 2008/0021880 A1 * | 1/2008 | Ren | G06F 40/169 |
| 2008/0080743 A1 * | 4/2008 | Schneiderman | G08B 13/196 382/118 |
| 2008/0297617 A1 * | 12/2008 | Jeong | H04N 23/611 348/222.1 |
| 2009/0037477 A1 | 2/2009 | Choi et al. | |
| 2009/0135269 A1 | 5/2009 | Nozaki et al. | |
| 2009/0245573 A1 * | 10/2009 | Saptharishi | H04N 23/631 382/103 |
| 2009/0303079 A1 * | 12/2009 | Khim | G08G 1/065 340/932.2 |
| 2010/0045781 A1 * | 2/2010 | Flon | H04N 13/366 348/E13.001 |
| 2010/0111377 A1 * | 5/2010 | Monroe | G07C 9/38 382/118 |
| 2010/0257195 A1 * | 10/2010 | Inoue | H04W 4/02 707/769 |
| 2010/0277599 A1 * | 11/2010 | Nozaki | H04N 1/00442 348/207.1 |
| 2011/0007901 A1 * | 1/2011 | Ikeda | H04N 1/00347 380/270 |
| 2011/0058060 A1 * | 3/2011 | Bigioi | H04N 5/2621 348/222.1 |
| 2011/0087677 A1 * | 4/2011 | Yoshio | H04N 5/76 707/E17.059 |
| 2011/0150273 A1 * | 6/2011 | Moore | G06V 20/70 707/E17.014 |
| 2012/0020643 A1 * | 1/2012 | Kato | G06F 16/784 386/E5.003 |
| 2012/0062732 A1 * | 3/2012 | Marman | G06T 7/277 348/142 |
| 2012/0127329 A1 * | 5/2012 | Voss | H04N 23/6811 348/208.4 |
| 2012/0147036 A1 * | 6/2012 | Yoshikawa | G06F 3/1423 345/1.3 |

FOREIGN PATENT DOCUMENTS

| | | |
|---|---|---|
| JP | 2007-026316 A | 2/2007 |
| JP | 2008-219570 A | 9/2008 |
| JP | 2009-141781 A | 6/2009 |
| JP | 2010-098550 A | 4/2010 |
| JP | 2012-033054 A | 2/2012 |
| JP | 2012-058838 A | 3/2012 |

OTHER PUBLICATIONS

Japanese Office Action for JP Application No. 2014-528040 mailed on Apr. 1, 2019 with English Translation.
Office Action dated Jun. 3, 2019 from US Patent Office in counterpart U.S. Appl. No. 16/274,453.

* cited by examiner

IMAGE PROCESSING SYSTEM, IMAGE PROCESSING METHOD, AND PROGRAM

CROSS-REFERENCES

The present application is a Continuation application of Ser. No. 16/837,061 filed on Apr. 1, 2020, which is a Continuation Application of Ser. No. 16/274,474 filed on Feb. 13, 2019, (U.S. Pat. No. 10,623,659 issued on Apr. 14, 2020), which is a Continuation Application of Ser. No. 14/417,880 filed on Jan. 28, 2015, (U.S. Pat. No. 10,368,010 issued on Jul. 30, 2019), which is a National Stage Entry of International Application PCT/JP2013/066568 filed on Jun. 17, 2013, which claims the benefit of priority from Japanese Patent Application 2012-170403 filed on Jul. 31, 2012, the disclosures of all of which are incorporated in their entirety by reference herein.

BACKGROUND

Aspects of the present invention relate to an image processing system, an image processing method, and a program.

In recent years, systems for carrying out monitoring over a wide range using video images from a plurality of cameras are being considered. For example, Patent Publication JP-A-2008-219570 discloses a device that is capable of appropriately tracking (monitoring) a person across cameras using inter-camera coupling relation information. The device determines a correspondence relation of a person in accordance with a similarity in person visual features between a point where a person appears in a camera view (an appearing point) and a point where the person disappears from the camera view (a vanishing point).

When a correspondence relation of a person is automatically determined according to similarity as is the case of the device described in Patent Publication JP-A-2008-219570, errors occur with a probability. In consideration thereof, there are demands for person re-identification with human involvement.

However, person re-identification by a human initiative conceivably results in complicating operations. When operations for re-identification become too complicated, work for re-identification becomes preoccupying and causes problems such as paying less attention to monitoring and creating a psychological obstacle to use.

SUMMARY

Some of the aspects of the present invention have been made in consideration of such problems, and an object of these aspects is to provide an image processing system, an image processing method, and a program capable of re-identification of a person appearing in a video image with a simple operation.

An image processing system according to the present invention includes: input means for accepting input video images captured by a plurality of video cameras; first display control means for causing at least one video image among the video images inputted from the input means to be displayed by a display device; registering means capable of registering one or more persons appearing in the video image displayed by the display device; and second display control means for selectably displaying, when a person appears in the video image displayed by the display device, person images which are associable to the person and which are related to one or more persons registered by the registering means in a vicinity of the video image.

An image processing method according to the present invention includes the steps of: accepting input of video images captured by a plurality of video cameras; causing at least one video image among the inputted video images to be displayed by a display device; registering one or more persons appearing in the video image displayed by the display device; and selectably displaying, when a person appears in the video image displayed by the display device, person images, which are associable to the person and which are related to one or more registered persons, in a vicinity of the video image.

A program according to the present invention causes a computer to execute the processes of: accepting input of video images captured by a plurality of video cameras; causing at least one video image among the inputted video images to be displayed by a display device; registering one or more persons appearing in the video image displayed by the display device; and selectably displaying, when a person appears in the video image displayed by the display device, person images, which are associable to the person and which are related to one or more registered persons, in a vicinity of the video image.

Moreover, as used in the present invention, the terms "unit", "means", "device", and "system" not only signify physical means but also include cases where functions of the "unit", "means", "device", and "system" are realized by software. In addition, functions of one "unit", "means", "device", or "system" may be realized by two or more physical means or devices, and functions of two or more "units", "means", "devices", or "systems" may be realized by one physical means or device.

According to the present invention, an image processing system, an image processing method, and a program capable of re-identification of a person appearing in a video image with a simple operation can be provided.

EXEMPLARY EMBODIMENTS

Figure 1:
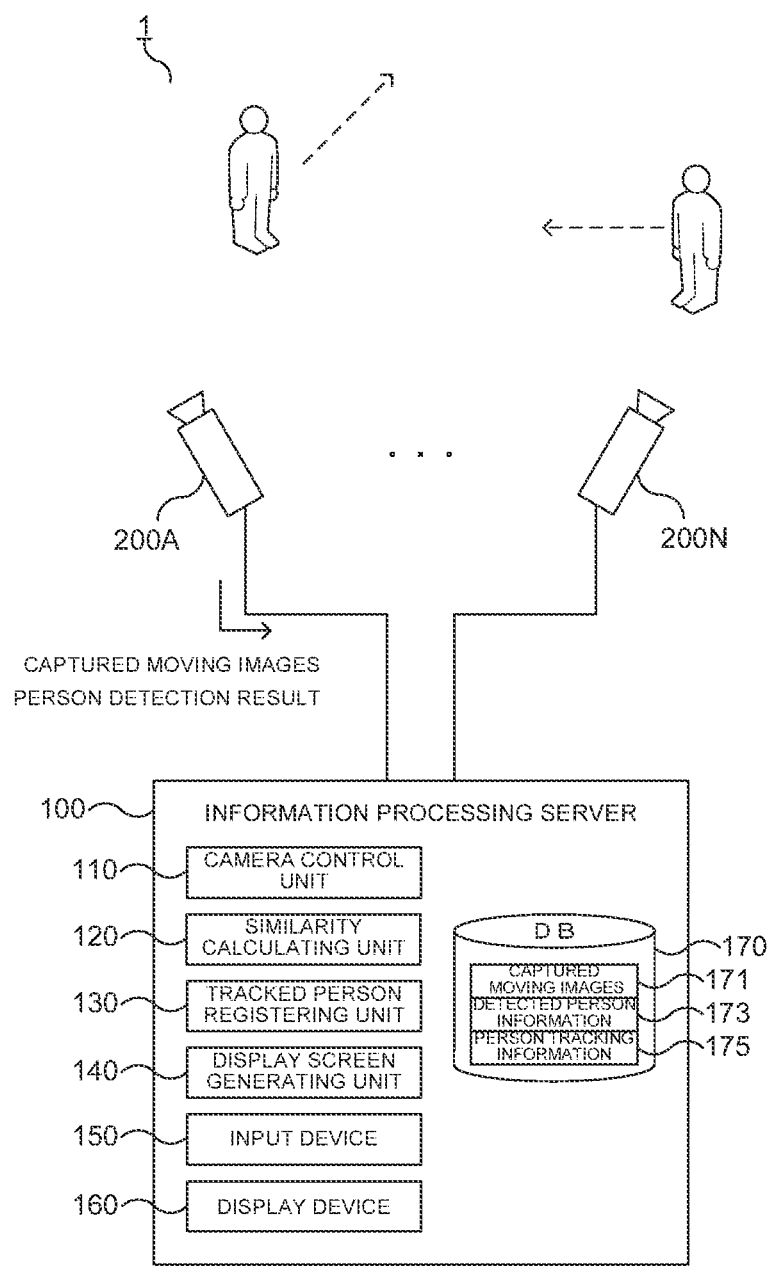
FIG. 1 is a functional block diagram showing a schematic configuration of a monitoring system according to a first embodiment.

Hereinafter, embodiments of the present invention will be described. In the following description and in the description of the referenced drawings, same or like components are represented by same or like reference characters.

1 First Embodiment

FIGS. 1 to 5 are diagrams for describing a first embodiment. Hereinafter, the present embodiment will be described in the order explained below with reference to these drawings. First, a functional configuration of a system as a whole is presented in "1.1", and an outline of the first embodiment as a whole is presented in "1.2" by showing a specific example of a display screen. Subsequently, a flow of processes is presented in "1.3", and a specific example of a feasible hardware configuration is presented in "1.4".

Finally, operational effects achieved by the present embodiment and the like are described in "1.5" and thereafter.

(1.1 Functional Configuration)

A functional configuration of a monitoring system 1 that is an image processing system according to the present embodiment will now be described with reference to FIG. 1. FIG. 1 is a block diagram showing a functional configuration of the monitoring system 1.

The monitoring system 1 is roughly constituted by an information processing server 100 and a plurality of video cameras 200 (video cameras 200A to 200N will be collectively referred to as a video camera 200) for capturing video images.

The video camera 200 captures a video image, judges whether or not a person appears in the captured video image, and transmits information related to the person such as a position and a visual feature to the information processing server 100 together with the captured video image. In addition, the video camera 200 can perform tracking of a person appearing in a captured video image.

Moreover, processes such as detection of a person, extraction of a visual feature of a person, and tracking of a person inside a camera can be performed by, for example, the information processing server 100 or by another information processing device (not shown).

The information processing server 100 performs various processes such as detection of a person, registration of a person to be tracked, and tracking of a registered person by analyzing a video image captured by the video camera 200.

While a case where person monitoring is performed based on a real-time video image captured by the video camera 200 will be described below, the present embodiment is not limited to this case and, for example, monitoring (analysis) may conceivably be performed on a video image previously captured by the video camera 200.

The information processing server 100 comprises a camera control unit 110, a similarity calculating unit 120, a tracked person registering unit 130, a display screen generating unit 140, an input device 150, a display device 160, and a database (DB) 170.

Functions of the information processing server 100 may be realized by, for example, a plurality of devices such as a server and a client, in which case processes such as control of a camera (the camera control unit 110), registration of a person to be tracked (the tracked person registering unit 130), and generation of a display screen (the display screen generating unit 140) are performed by the server and processes such as input by a user (observer) (the input device 150) and output of a display screen (the display device 160) are performed by the client. Various methods of sharing processes between the server and the client are conceivable.

The camera control unit 110 controls the video camera 200. More specifically, based on an user instruction or the like inputted from the input device 150, the camera control unit 110 transmits commands for zooming in, zooming out, changing a imaging direction of camera upward, downward, leftward, or rightward, and the like to the video camera 200. In addition, the camera control unit 110 registers a video image or person detection information received from the video camera 200 with the DB 170 as a captured video image 171 or detected person information 173.

The similarity calculating unit 120 calculates a similarity between a person appearing in a video image inputted from the video camera 200 and a person registered with person tracking information 175. In doing so, the similarity calculating unit 120 calculates the similarity by selecting a person image showing a person in a posture similar to that shown in an image of a person in the video image inputted from the video camera 200 from a plurality of person images (person images of a same person taken at a plurality of timings) related to each registered person. Accordingly, an accuracy of similarity calculation can be increased.

In this case, specifically, "a similar posture" refers to a posture that enables states such as whether a person is facing the front, backward, rightward, or leftward, whether the person is bending down or not, and whether or not the person is overlapping with another person to be judged as being the same or similar (a posture with similar parameters for judging such states).

Based on the user instruction and the like inputted from the input device 150, the tracked person registering unit 130 registers a person appearing in a captured video image inputted from the video camera 200 as a person under monitoring who is a tracking subject (monitoring target) with the person tracking information 175 of the DB 170. In addition, when the person appearing in the captured video image inputted from the video camera 200 is judged to be the same person as a person already registered with the person tracking information 175, the tracked person registering unit 130 can also register the information with the person tracking information 175.

The display screen generating unit 140 generates a display screen such as that shown in FIG. 2 (to be described later) to be displayed by the display device 160. The display screen generated by the display screen generating unit 140 and displayed by the display device 160 shows one or more video images (multi-camera video images) captured by the video camera 200 and a graphical user interface (GUI) which can be used to choose whether or not to newly register a person appearing in the video image as a person who is a tracking subject, whether or not to associate the person appearing in the video image as the same person as a person who has already been registered, or the like.

The input device 150 is a device used by a user (observer) for inputting various types of information. For example, a pointing device such as a mouse, a touch pad, or a touch panel, a keyboard, and the like corresponds to the input device 150. The various afore-mentioned processes performed by the tracked person registering unit 130 such as the registration of a person who is a subject and association with a registered person are carried out based on operations of the input device 150.

The display device 160 is a display in which an image is displayed on, for example, a liquid crystal or an organic electro luminescence (EL). The display screen created by the display screen generating unit 140 is displayed by the display device 160.

The DB 170 is built on various storage devices such as a hard disk drive (HDD; not shown). The DB 170 stores a captured video image 171, detected person information 173, and person tracking information 175.

Video images inputted from the video camera 200 are stored in the captured video image 171. Moreover, the captured video image 171 may be configured so that, for example, portions which have been stored for a certain period of time after capturing or portions which are judged as not showing a person are deleted.

The detected person information 173 is information such as a visual feature or a position of a person detected by the video camera 200 and a person image.

The person tracking information 175 is information regarding a person judged to be a tracking subject by the tracked person registering unit 130 among persons detected as the detected person information 173. When persons appearing in video images taken by the plurality of video cameras 200 are associated with each other as the same person by the tracked person registering unit 130, such information is also registered in the person tracking information 175.

(1.2 Specific Example of Display Screen)
(1.2.1 Specific Example of Entire Display Screen)

Hereinafter, a specific example of a display screen displayed by the display device 160 will be described with reference to FIG. 2. FIG. 2 is a diagram showing a specific example of a display screen (hereinafter, also referred to as a monitoring screen 20) that is displayed by the display device 160 for person monitoring.

In the example shown in FIG. 2, the monitoring screen 20 includes video image display regions 21A to 21D (hereinafter, also collectively referred to as a video image display region 21) which display captured video images inputted from the plurality of video cameras 200 and a monitoring subject display region 23 which displays a person who is a monitoring subject.

As described above, the video image display region 21 displays multi-camera video images inputted from the plurality of video cameras 200. The video images of the video cameras 200 displayed in the respective video image display regions 21 may be switched at any time to other video images. For example, control can conceivably be performed so that after a person who is a monitoring subject moves out of a display region, the display is switched to a video image of the video camera 200 in which the person is presumed to appear next in accordance with the movement of the person.

The monitoring subject display region 23 is a region in which is registered a person selected by the user who is a observer as a monitoring subject among the persons appearing in the video image display region 21. As in the example shown in FIG. 2, a plurality of persons under monitoring can be selected (five in the example shown in FIG. 2). In addition, for each person, a plurality of person images (two in the example shown in FIG. 2) showing different postures such as front and back is displayed in the monitoring subject display region 23.

Figure 2:
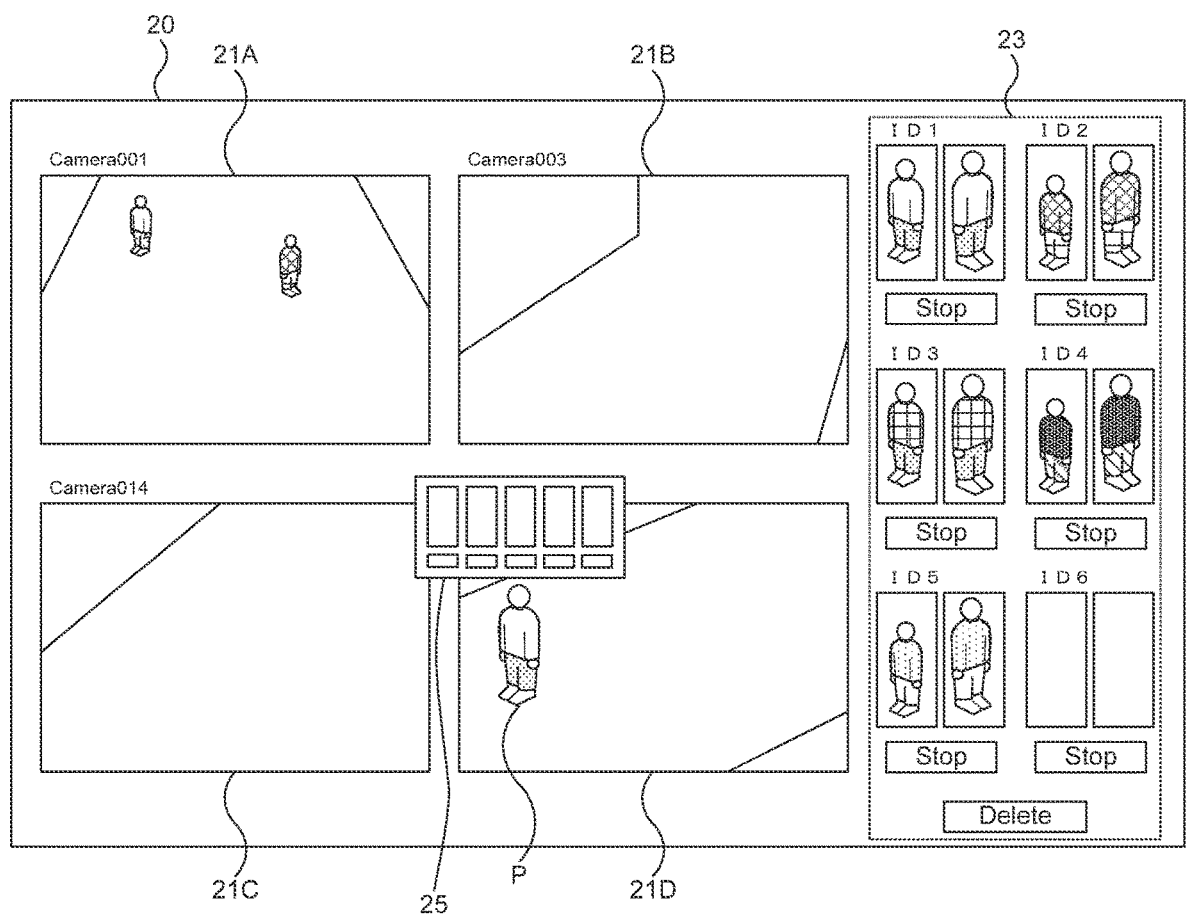
FIG. 2 is a flow chart showing a specific example of a display screen.

Furthermore, in the example of the monitoring screen 20 shown in FIG. 2, a pop-up window 25 is displayed above a person P appearing in the video image display region 21D. The pop-up window 25 is used to select whether or not the person P is to be a monitoring subject and whether or not the person P is the same person as a person already registered on the monitoring subject display region 23 as a monitoring subject.

The pop-up window 25 is displayed in a vicinity of a newly detected person P. In addition, a position of the pop-up window 25 also moves along with a movement (motion) of the person P. Displaying the pop-up window 25 nearby produces such effects as making it easier to identify a person P to be newly registered, enabling comparisons between the person P and persons under monitoring to be made more easily, and reducing a range (distances) of operation. Moreover, playback of the video image that shows the person P can be stopped temporarily when displaying the pop-up window.

(1.2.2 Specific Example of Pop-Up Window)

Figure 3:
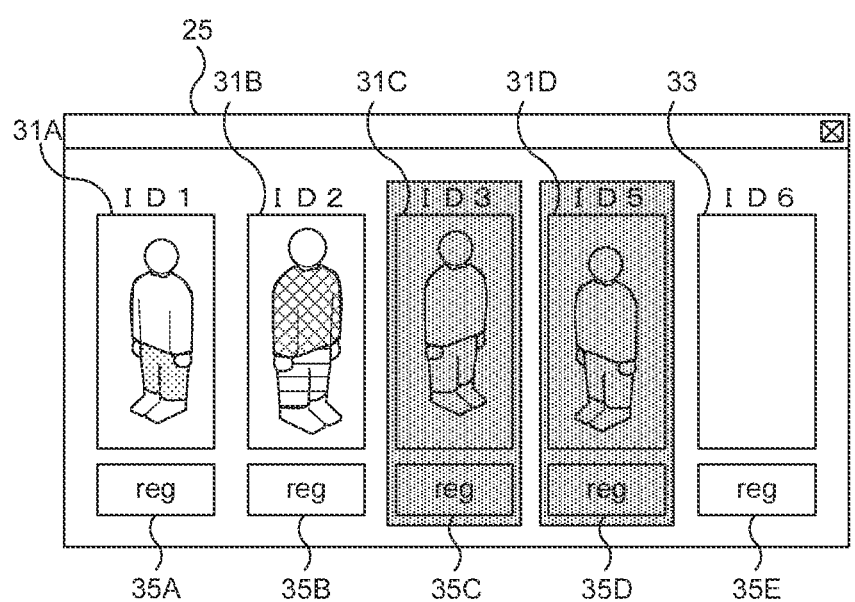
FIG. 3 is a diagram showing a specific example of a pop-up window displayed on the display screen shown in FIG. 2.

FIG. 3 is a diagram showing a specific example of the pop-up window 25. In the example shown in FIG. 3, person images 31A to 31D (hereinafter, also collectively referred to as a person image 31) which are thumbnails of persons under monitoring respectively assigned ID1, ID2, ID3, and ID5 and a blank image 33 assigned ID6 are arranged side by side.

Moreover, while the present embodiment will be described using a case where still images are displayed as person images 31 as an example, the present embodiment is not limited thereto and, for example, video images may be displayed instead.

Registration buttons 35A to 35E (hereinafter, also collectively referred to as a registration button 35) are arranged below the person images 31 and the blank image 33. The registration buttons 35A to 35D are for registering persons under monitoring who correspond to ID1, ID2, ID3, and ID5 and who have been registered in advance as the same person as the person P appearing in the video image. The registration button 35E is for registering the person P as a new person under monitoring with ID6 separate from the persons under monitoring who correspond to ID1, ID2, ID3, and ID5 and who have been registered in advance.

For the person images 31A to 31D, images of postures similar to the posture of the person P appearing in the video image (for example, when similarities regarding postures are calculated, images exceeding a threshold) are selected from images regarding persons under monitoring extracted from a history of previous video images.

In addition, unlike the person images 31A and 31B, the person images 31C and 31D are grayed out. This is because calculated similarities between the person images 31C and 31D (persons under monitoring corresponding to ID3 and ID5) and the person P are equal to or lower than the threshold and, at the same time, calculated similarities between the person images 31A and 31B (persons under monitoring corresponding to ID1 and ID2) and the person P are higher than the threshold. In other words, since it is highly likely that the person P is either the person under monitoring with ID1 or the person under monitoring with ID2, these persons under monitoring are displayed separately from the persons under monitoring with ID3 and ID5 who are less likely to be the person P.

Moreover, in the example of the pop-up window 25 shown in FIG. 3, a person image of a person under monitoring with ID4 is not displayed. This is because a similarity between the person under monitoring with ID4 and the person P is even lower than the persons under monitoring with ID3 and ID5. In other words, persons under monitoring with extremely low similarities who are highly unlikely to be the same person are not presented as persons under monitoring. Accordingly, since the user who is a observer can reduce the number of persons under monitoring to be judged whether or not the persons are the same as the person P, the identities of the persons under monitoring can be judged by a more simplified operation.

(1.3 Flow of Processes)

Figure 4:
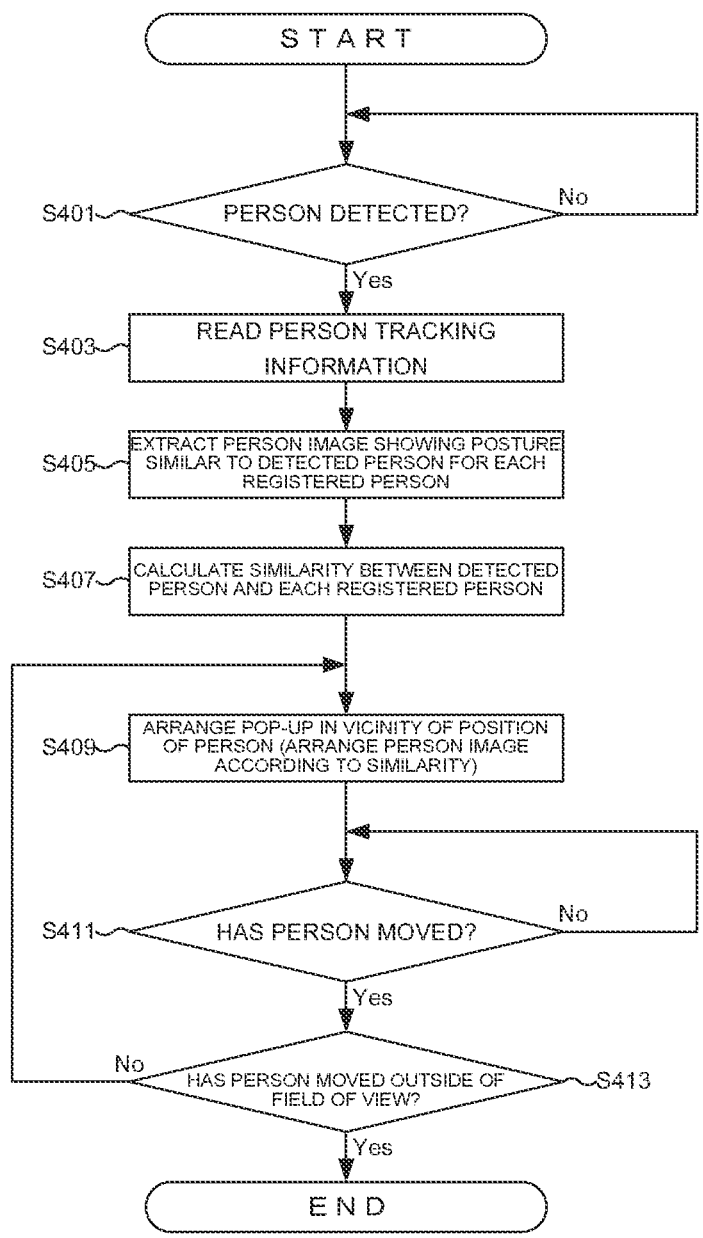
FIG. 4 is a flow chart showing a flow of processes of the information processing server shown in FIG. 1.

Next, processes performed by the information processing server 100 will be described with reference to FIG. 4. FIG. 4 is a flow chart showing a flow of processes of the information processing server 100 according to the present embodiment.

It should be noted that, as long as no contradictions are created in contents of the processes, the respective process steps described below can be arbitrarily reordered or executed in parallel, or another step may be added between the respective process steps. Furthermore, a step described as a single step for convenience' sake can be executed by dividing the step into a plurality of steps, and steps described divided into a plurality of steps for convenience' sake can be executed as a single step.

First, the camera control unit 110 of the information processing server 100 judges whether or not a person has been detected in an input image from the video camera 200 (S401). For example, when person detection is performed by the video camera 200, the judgment can be made by the camera control unit 110 according to a person detection result received from the video camera 200.

The similarity calculating unit 120 reads person tracking information 175 from the DB 170 in order to calculate a similarity between the person detected in S401 and a person under monitoring (S403). The person tracking information 175 includes information such as a visual features and previous images of the persons under monitoring. For person images related to each person registered as a person under monitoring, the similarity calculating unit 120 calculates a similarity of postures between a person registered as a person under monitoring and the person detected by the video camera 200 to extract a person image (thumbnail) with the most similar posture (S405).

Subsequently, a similarity between the person image with the most similar posture of each person under monitoring and an image of the person detected by the video camera 200 is calculated (S407). Accordingly, since the similarities between the person detected by the video camera 200 and the persons under monitoring are calculated, the display screen generating unit 140 arranges the pop-up window 25 in a vicinity of (in the example shown in FIG. 2, above) the person detected by the video camera 200 (S409). At this point, as described in "1.2.2" above, the pop-up window 25 according to the present embodiment is presented to the user who is a observer so as to clearly indicate low similarities by not displaying persons under monitoring with similarities that are lower than a first threshold and graying out persons under monitoring with similarities that are lower than a second threshold that is higher than the first threshold.

Subsequently, when the person in the video image moves (Yes in S411), and the movement is not to the outside of the field of view of the video image (No in S413), a return is made to S409 to reposition the pop-up window 25 to the vicinity of the person. Moreover, while processes of S405 and S407 are only performed once in the present embodiment, the processes of S405 and S407 may be repeated depending on a variation of a posture or the like of the person appearing in the video image.

(1.4 Configuration of Information Processing Device)

Hereinafter, an example of a hardware configuration of the afore-mentioned information processing server 100 will be described with reference to FIG. 5. Moreover, as described earlier, the functions of the information processing server 100 can be realized by a plurality of information processing devices (for example, by a server and a client).

Figure 5:
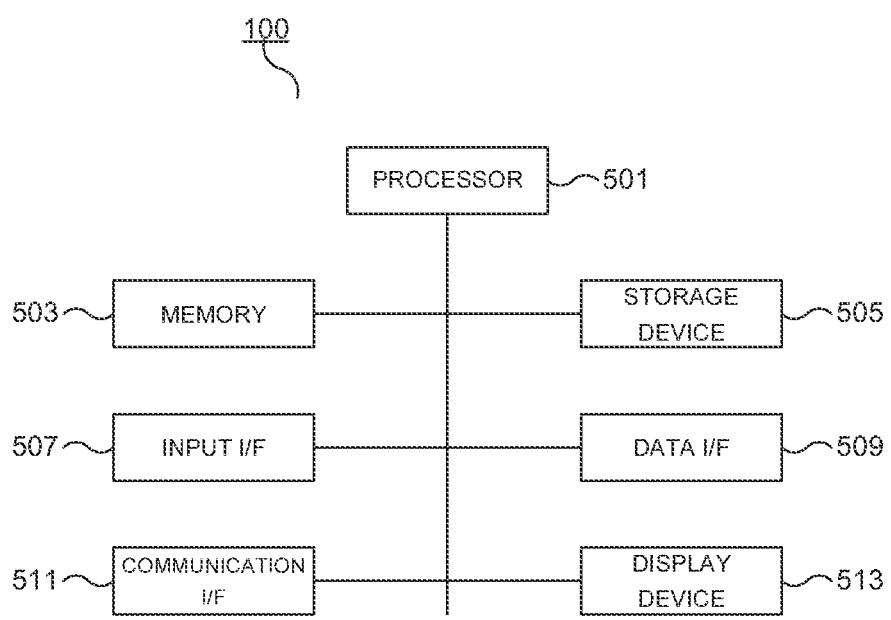
FIG. 5 is a block diagram showing a functional configuration of a hardware configuration capable of implementing the information processing server shown in FIG. 1.

As shown in FIG. 5, the information processing server 100 comprises a processor 501, a memory 503, a storage device 505, an input interface (I/F) 507, a data I/F 509, a communication I/F 511, and a display device 513.

The processor 501 controls various processes performed by the information processing server 100 by executing a program stored in the memory 503. For example, processes related to the camera control unit 110, the similarity calculating unit 120, the tracked person registering unit 130, and the display screen generating unit 140 described with reference to FIG. 1 can be realized as a program which is temporarily stored in the memory 503 and which mainly runs on the processor 501.

The memory 503 is a storage medium such as a random access memory (RAM). The memory 503 temporarily stores program codes of the program that is executed by the processor 501 and data necessary when executing the program. For example, a stack region that is required when executing the program is secured in a storage region of the memory 503.

The storage device 505 is a non-volatile storage medium such as a hard disk or a flash memory. The storage device 505 stores an operating system, various programs for realizing the camera control unit 110, the similarity calculating unit 120, the tracked person registering unit 130, and the display screen generating unit 140, various data including captured video images 171, detected person information 173, and person tracking information 175 which are stored as the DB 170, and the like. Programs and data stored in the storage device 505 are referenced by the processor 501 by being loaded to the memory 503 as required.

The input I/F 507 is a device for accepting user input. The input device 150 described with reference to FIG. 1 is realized by the input I/F 507. Specific examples of the input I/F 507 include a keyboard, a mouse, a touch panel, and various sensors. The input I/F 507 may be connected to the information processing server 100 via an interface such as a universal serial bus (USB).

The data I/F 509 is a device for inputting data from outside the information processing server 100. Specific examples of the data I/F 509 include drive devices and the like for reading data stored in various storage media. The data I/F 509 may conceivably be provided outside the information processing server 100. In such a case, the data I/F 509 is connected to the information processing server 100 via an interface such as a USB.

The communication I/F 511 is a device for performing wired or wireless data communication with a device outside the information processing server 100 including the video camera 200. The communication I/F 511 may conceivably be provided outside the information processing server 100. In such a case, the communication I/F 511 is connected to the information processing server 100 via an interface such as a USB.

The display device 513 is a device for displaying various types of information including the monitoring screen 20 and is, for example, a liquid crystal display or an organic electro-luminescence (EL) display. The display device 513 may be provided outside the information processing server 100. In such a case, the display device 513 is connected to the information processing server 100 via a display cable or the like.

(1.5 Operational Effects of the Present Embodiment)

As described above, the information processing server 100 according to the present embodiment is configured so as to display the pop-up window 25 when newly registering a person P appearing in the video camera 200 as a person under monitoring or associating the person P as the same person as a person under monitoring already registered. The pop-up window 25 is configured so as to display the person images (thumbnails) of a plurality of persons under monitoring (tracking subjects) side by side and to display person images showing postures similar to that of the person P. In addition, the pop-up window 25 grays out or hides person images depending on similarities. Furthermore, the pop-up window 25 moves along with a movement of the person P.

Due to such processes, operations by the user who is a observer related to monitoring and associating the person P (specifically, operations for finding and selecting a person under monitoring corresponding to the person P) can be simplified.

2 Second Embodiment

Figure 6:
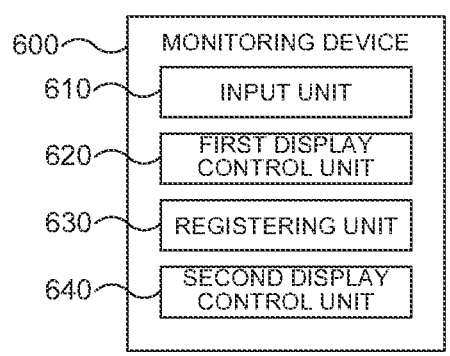
FIG. 6 is a functional block diagram showing a schematic configuration of a monitoring device according to a second embodiment.

Hereinafter, a second embodiment will be described with reference to FIG. 6. FIG. 6 is a block diagram showing a functional configuration of a monitoring device 600 that is an image processing system. As shown in FIG. 6, the monitoring device 600 comprises an input unit 610, a first display control unit 620, a registering unit 630, and a second display control unit 640.

The input unit 610 accepts input of video images captured by a plurality of video cameras. The first display control unit 620 causes a display device (not shown) to display at least one video image among the video images inputted from the input unit 610.

The registering unit 630 registers at least one person appearing in the video image displayed by the display device. When a person appears in the video image displayed by the display device, the second display control unit 640 selectably displays person images of one or more persons which are associable with the person and which are registered by the registering unit 630 in a vicinity of the video image.

By adopting such an implementation, the monitoring device 600 according to the present embodiment enables association of a person appearing in a video image to be performed by a simple operation.

3. Appendix

Moreover, the configurations of the embodiments described above may be combined with each other or a part of the components may be replaced. In addition, configurations of the present invention are not limited to the embodiments described above and various modifications may be made without departing from the spirit and scope thereof.

A part of or all of the embodiments described above may also be described as, but not limited to, the Supplementary notes provided below. In addition, the program according to the present invention need only be a program that causes a computer to execute the respective operations described in the embodiments described above.

(Supplementary Note 1)

An image processing system comprising: input means for accepting input of video images captured by a plurality of video cameras; first display control means for causing at least one video image among the video images inputted from the input means to be displayed by a display device; registering means capable of registering one or more persons appearing in the video image displayed by the display device; and second display control means which selectably displays, when a person appears in the video image displayed by the display device, person images which are associable to the person and which are related to one or more persons registered by the registering means in a vicinity of the video image.

(Supplementary Note 2)

The image processing system according to Supplementary note 1, wherein when a person image is selected, the registering means associates the person corresponding to a person image and a person appearing in a video image displayed by the display device.

(Supplementary Note 3)

The image processing system according to Supplementary note 1 or 2, wherein the first display control means displays a blank image along with the person image and newly registers a person appearing in a video image displayed by the display device when the blank image is selected.

(Supplementary Note 4)

The image processing system according to any one of Supplementary notes 1 to 3, wherein when a similarity between a person appearing in a video image displayed by the display device and one or a plurality of persons registered by the registering means is lower than a threshold, the second display control means displays the person image of the person, whose similarity is lower than the threshold, so as to be separate from the person image of a person whose similarity exceeds the threshold.

(Supplementary Note 5)

The image processing system according to any one of Supplementary notes 1 to 3, wherein the image processing system displays the person image of a person whose similarity between the person appearing in the video image displayed by the display device and one or more persons registered by the registering means is higher than those of other persons.

(Supplementary Note 6)

The image processing system according to any one of Supplementary notes 1 to 5, wherein the second display control means displays the person image showing a posture approximating that of the person appearing in the video image displayed by the display device.

(Supplementary Note 7)

The image processing system according to any one of Supplementary notes 1 to 5, wherein the second display control means is capable of displaying person images showing different orientations of a same person.

(Supplementary Note 8)

The image processing system according to any one of Supplementary notes 1 to 7, wherein the second display control means changes a position of the person image in accordance with a movement of the person appearing in the video image displayed by the display device.

(Supplementary Note 9)

An image processing method of an image processing system, the image processing method comprising the steps of: accepting input of video images captured by a plurality of video cameras; causing at least one video image among the inputted video images to be displayed by a display device; registering one or more persons appearing in the video image displayed by the display device; and selectably displaying, when a person appears in the video image displayed by the display device, person images, which are associable to the person and which are related to one or more registered persons, in a vicinity of the video image.

(Supplementary Note 10)

The image processing system according to Supplementary note 9, wherein when a person image is selected, the image processing system associates the person corresponding to a person image and a person appearing in a video image displayed by the display device.

(Supplementary Note 11)

The image processing system according to Supplementary note 9 or 10, wherein the image processing system displays a blank image along with the person image and newly registers a person appearing in a video image displayed by the display device when the blank image is selected.

(Supplementary Note 12)

The image processing system according to any one of Supplementary notes 9 to 11, wherein when a similarity between a person appearing in a video image displayed by the display device and one or a plurality of persons registered is lower than a threshold, the image processing system displays the person image of the person, whose similarity is lower than the threshold, so as to be separate from the person image of a person whose similarity exceeds the threshold.

(Supplementary Note 13)

The image processing system according to any one of Supplementary notes 9 to 11, wherein the image processing system displays the person image of a person whose similarity between the person appearing in the video image displayed by the display device and one or more persons registered is higher than those of other persons.

(Supplementary Note 14)

The image processing system according to any one of Supplementary notes 9 to 13, wherein the image processing system displays the person image showing a posture approximating that of the person appearing in the video image displayed by the display device.

(Supplementary Note 15)

The image processing system according to any one of Supplementary notes 9 to 14, wherein person images showing different orientations of a same person can be displayed.

(Supplementary Note 16)

The image processing system according to any one of Supplementary notes 9 to 15, wherein the image processing system changes a position of the person image in accordance with a movement of the person appearing in the video image displayed by the display device.

(Supplementary Note 17)

A program causing a computer to execute the processes of: accepting input of video images captured by a plurality of video cameras; causing at least one video image among the inputted video images to be displayed by a display device; registering one or more persons appearing in the video image displayed by the display device; and selectably displaying, when a person appears in the video image displayed by the display device, person images, which are associable to the person and which are related to one or more registered persons, in a vicinity of the video image.

(Supplementary Note 18)

The program according to Supplementary note 17, wherein the program execute the process of associating the person corresponding to a person image and a person appearing in a video image displayed by the display device when a person image is selected.

(Supplementary Note 19)

The program according to Supplementary note 17 or 18, wherein the program execute the process of displaying a blank image along with the person image and newly registers a person appearing in a video image displayed by the display device when the blank image is selected.

(Supplementary Note 20)

The program according to any one of Supplementary notes 17 to 19, wherein when a similarity between a person appearing in a video image displayed by the display device and one or a plurality of persons registered by the registering means is lower than a threshold, the program execute the process of displaying the person image of the person, whose similarity is lower than the threshold, so as to be separate from the person image of a person whose similarity exceeds the threshold.

(Supplementary Note 21)

The program according to any one of Supplementary notes 17 to 19, wherein the program execute the process of displaying the person image of a person whose similarity between the person appearing in the video image displayed by the display device and one or more persons registered by the registering means is higher than those of other persons.

(Supplementary Note 22)

The program according to any one of Supplementary notes 17 to 21, wherein the program execute the process of displaying the person image showing a posture approximating that of the person appearing in the video image displayed by the display device.

(Supplementary Note 23)

The program according to any one of Supplementary notes 17 to 21, wherein person images showing different orientations of a same person can be displayed.

(Supplementary Note 24)

The program according to any one of Supplementary notes 17 to 23, wherein the program execute the process of changing a position of the person image in accordance with a movement of the person appearing in the video image displayed by the display device.

The present application claims priority on the basis of Japanese Patent Application No. 2012-170403 filed on Jul. 31, 2012, the entire contents of which are incorporated herein by reference.

The invention claimed is:

1. A person tracking apparatus comprising:
one or more non-transitory storage devices configured to store instructions; and
one or more processors configured to execute the instructions to:
receive a first video captured by a first camera, a second video captured by a second camera, and a third video captured by a third camera; and
in response to determining that one or more monitored person are shown in the third video, cause a display device to display thumbnail images with the third video in a same displayed screen, based on the one or more monitored persons appearing in the third video,
the thumbnail images including a first thumbnail image based on the first video captured by the first camera and a second thumbnail image based on the second video captured by the second camera which is different from the first camera, wherein the thumbnail images show different postures of a monitored person in related videos,
the first thumbnail image being a part of the first video, the second thumbnail image being a part of the second video, and
each of the thumbnail images indicating a person determined to have a similarity to the monitored person appearing in the third video,
wherein the monitored person appears in each of the first video, the second video, and the third video.

2. The person tracking apparatus according to claim 1, wherein each of the thumbnail images includes both of a head and a part of a body of the person of a standing posture.

3. The person tracking apparatus according to claim 2, wherein each of the thumbnail images is longer in a vertical direction than as compared to a horizontal direction.

4. The person tracking apparatus according to claim 1, wherein the one or more non-transitory storage devices are configured to:

store the first video and the second video previously captured by the first camera and the second camera.

5. The person tracking apparatus according to claim 1, wherein the one or more processors are further configured to:
calculate a similarity between persons indicated by each of the thumbnail images and the one or more monitored persons appearing in the third video.

6. The person tracking apparatus according to claim 1, wherein each of the thumbnail images indicates the person determined to have a similarity value that is greater than a threshold value.

7. The person tracking apparatus according to claim 1, wherein each of the thumbnail images indicates the person determined to have a similarity value that is greater than a threshold value, and wherein the similarity value is calculated based on similarity to the monitored person.

8. The person tracking apparatus according to claim 1, wherein the related videos are the first video and the second video.

9. The person tracking apparatus according to claim 1, wherein each of the thumbnail images is an image that shows a whole body of a person determined to have a similarity to the monitored person.

10. The person tracking apparatus according to claim 1, wherein causing the display device to display the thumbnail images is based on the monitored person being determined as having a similarity greater than a threshold.

11. A method comprising:
receiving a first video captured by a first camera, a second video captured by a second camera, and a third video captured by a third camera; and
in response to determining one or more monitored person shown in the third video, causing a display device to display thumbnail images with the third video in a same displayed screen, based on the one or more monitored persons appearing in the third video,
the thumbnail images including a first thumbnail image based on the first video captured by the first camera and a second thumbnail image based on the second video captured by the second camera which is different from the first camera, the first thumbnail image being a part of the first video, and the second thumbnail image being a part of the second video, wherein the thumbnail images show different postures of a monitored person in related videos, and
each of the thumbnail images indicating a person determined to have a similarity to the monitored person appearing in the third video,
wherein the monitored person appears in each of the first video, the second video, and the third video.

12. The method according to claim 11, wherein each of the thumbnail images includes both of a head and a part of a body of the person of a standing posture.

13. The method according to claim 12, wherein each of the thumbnail images is longer in a vertical direction than as compared to a horizontal direction.

14. The method according to claim 11, further comprising:
storing the first video and the second video previously captured by the first camera and the second camera.

15. The method according to claim 11, further comprising:
calculating a similarity between persons indicated by each of the thumbnail images and the one or more monitored persons appearing in the third video.

16. The method according to claim 11, wherein each of the thumbnail images indicates the person determined to have a similarity value that is greater than a threshold value.

17. The method according to claim 11, wherein each of the thumbnail images is an image that shows a whole body of a person determined to have a similarity to the monitored person.

18. A non-transitory computer-readable medium storing instructions, the instructions comprising: one or more instructions that, when executed by one or more processors of a person tracking apparatus, cause the one or more processors to:
receive a first video captured by a first camera, a second video captured by a second camera, and a third video captured by a third camera; and
in response to determining one or more monitored person shown in the third video, cause a display device to display thumbnail images with the third video in a same displayed screen, based on the one or more monitored persons appearing in the third video,
the thumbnail images including a first thumbnail image based on the first video captured by the first camera and a second thumbnail image based on the second video captured by the second camera which is different from the first camera, the first thumbnail image being a part of the first video, the second thumbnail image being a part of the second video, wherein the thumbnail images show different postures of a monitored person in related videos, and
each of the thumbnail images indicating a person determined to have a similarity to the monitored person appearing in the third video,
wherein the monitored person appears in each of the first video, the second video, and the third video.

19. The non-transitory computer-readable medium according to claim 18, wherein each of the thumbnail images includes both of a head and a part of a body of the person of a standing posture.

20. The non-transitory computer-readable medium according to claim 19, wherein each of the thumbnail images is longer in a vertical direction than as compared to a horizontal direction.

21. The non-transitory computer-readable medium according to claim 18, wherein the one or more instructions further cause the one or more processors to:
store the first video and the second video previously captured by the first camera and the second camera.

22. The non-transitory computer-readable medium according to claim 18, wherein the one or more instructions further cause the one or more processors to:
calculate a similarity between persons indicated by each of the thumbnail images and the one or more monitored persons appearing in the third video.

23. The non-transitory computer-readable medium according to claim 18, wherein each of the thumbnail images indicates the person determined to have a similarity value that is greater than a threshold value.

24. The non-transitory computer-readable medium according to claim 18, wherein each of the thumbnail images is an image that shows a whole body of a person determined to have a similarity to the monitored person.

* * * * *